E. C. ZISTERER.
VEHICLE SPRING CONSTRUCTION.
APPLICATION FILED APR. 10, 1915.
1,261,090.
Patented Apr. 2, 1918.
2 SHEETS—SHEET 2.
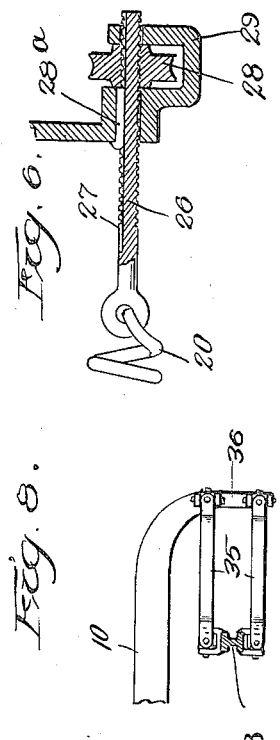
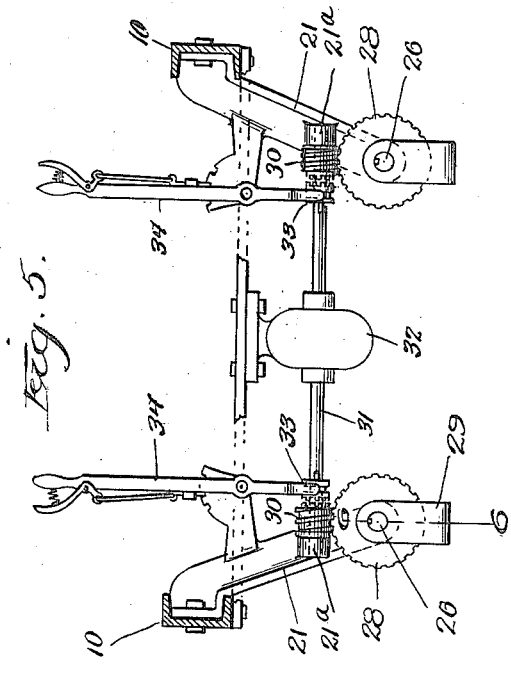
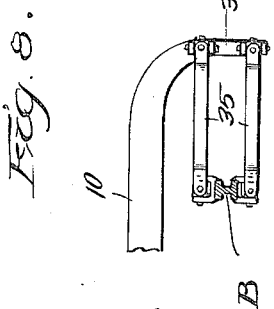
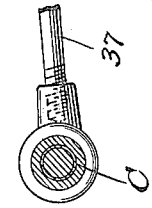
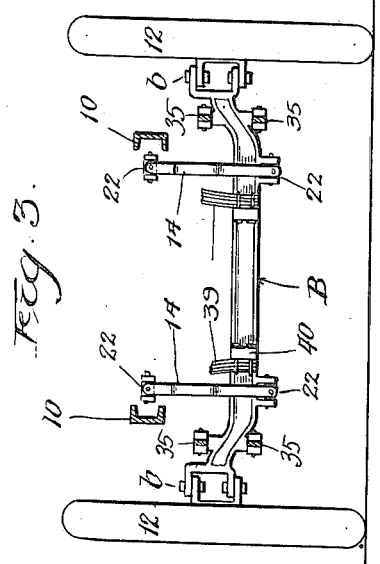
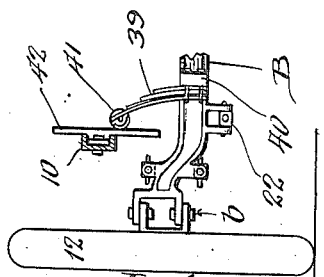

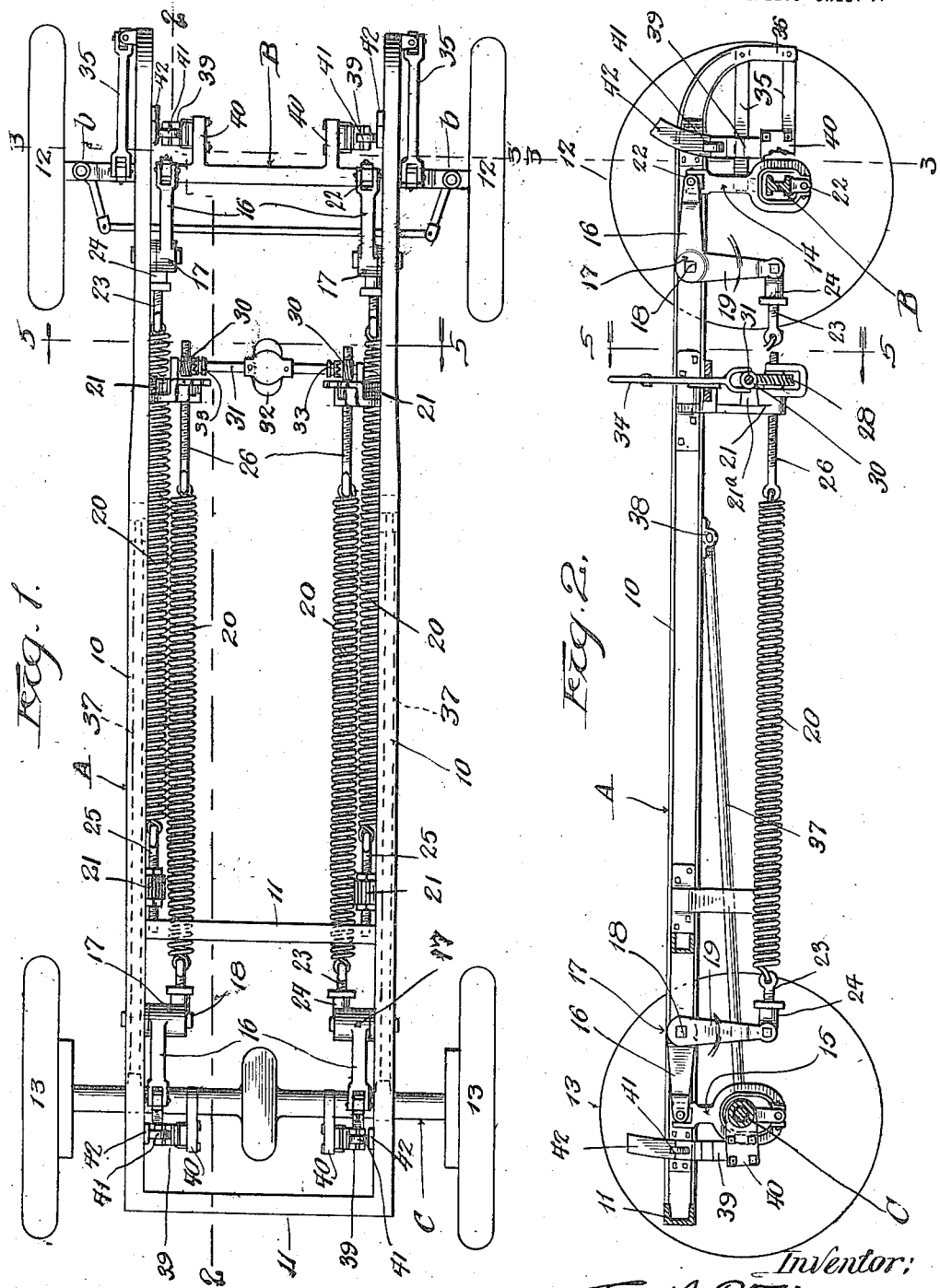

UNITED STATES PATENT OFFICE.

EMIL C. ZISTERER, OF CHICAGO, ILLINOIS.

VEHICLE SPRING CONSTRUCTION.

1,261,090.                     Specification of Letters Patent.      Patented Apr. 2, 1918.

Application filed April 10, 1915. Serial No. 20,399.

*To all whom it may concern:*

Be it known that I, EMIL C. ZISTERER, a citizen of the United States, and a resident of Chicago, Cook county, Illinois, have invented certain new and useful Improvements in Vehicle Spring Constructions, of which the following is declared to be a full, clear, and exact description.

This invention relates to vehicle spring constructions, and its primary object is to reduce to a minimum the shock and vibration occasioned by vehicles traveling on rough roads. Many attempts have been made heretofore to accomplish this result, but with only some substantial degree of satisfaction. It is my aim to provide a spring construction which shall practically free the body of the vehicle from all shock and vibration when traveling over rough roads, except, of course, at any places where raised obstructions or depressions are abnormally great.

Other objects and advantages will appear in the course of this specification, and with all of said objects and advantages in view, this invention consists in the several novel features hereinafter fully set forth and claimed.

The invention is clearly illustrated in the accompanying drawings in which:

Figure 1 is a plan of a vehicle provided with a simple form of the present invention; Fig. 2 is a vertical, longitudinal section taken on line 2—2 of Fig. 1; Fig. 3 is a vertical cross section taken on line 3—3 of Figs. 1 and 2; Fig. 4 is a detail front view of a fragment of the front axle and associated parts, the frame being in section, and showing means for yieldingly resisting side sway of the frame and body; Fig. 5 is a detail front view of a tension regulating device used in connection with the spring construction, the frame being shown in cross section and the line of section indicated at 5—5 in Figs. 1 and 2; Fig. 6 is a detail vertical section taken on line 6—6 of Fig. 5; Fig. 7 is a detail side view of a connection between the rear axle and a certain link; and Fig. 8 is a side view showing parallel movement links connecting the front axle and frame.

Referring to said drawings, which illustrate a simple embodiment of the invention, A designates a frame of ordinary and well-known form of construction used in motor vehicles, and having the usual side members, 10, and cross members, 11; said frame is used to carry a vehicle body (not shown) in the usual manner. The frame is carried by four wheels, 12, 13, mounted on axles, B, C, in the usual manner, the front axle, B, having knuckle joint connections, b, for the front wheels, and steering connections being provided for the front wheels in accordance with the common and well-known practice. The rear, drive wheels are driven from a motor (not shown) when the spring connection is applied to a motor driven vehicle. All of the parts thus far specifically described are well-known and require no further description as far as this specification is concerned.

The spring construction, forming the subject matter of this specification, will now be described. Supported from each axle are links, 14, 15, there being two links for each axle, one arranged adjacent the side members, 10, of the frame, A, and the other ends of said links are connected to horizontal arms, 16, of bell crank levers, 17, pivoted to the side members, 10, on horizontal pivot pins or bearings, 18. The bell crank levers have vertical arms, 19, which extend down from the hubs or pivots of the levers and have coiled tension springs, 20, secured thereto, which springs extend horizontally under the frame and are connected to brackets or arms, 21, bolted or otherwise fastened to the side members of the frame. The size and tensile strength of said springs is calculated to be sufficient to yieldingly support the frame and parts carried thereby.

The connections between the links and axles, and between the links and bell crank levers may comprise knuckle or universal joints, 22, of any suitable construction to permit of the irregular movements which the axles are subjected to in passing over rough roads. The connection between the bell crank levers and springs may include screw threaded members, 23, for attachment to the ends of the springs and threaded in couplings, 24, pivotally secured to the vertical arms of the bell crank levers. This arrangement provides simple means for regulating the tension of the springs. Adjustable connections may also be provided between the ends of the springs and the brackets or arms, 21, and as here shown said connections may comprise screw threaded spring connections, 25, extending through said brackets or arms and having nuts threaded thereon bearing against the brackets or arms, and affording means for tightening or loosening the spring tension.

It may be found desirable to regulate the tension of the springs of the rear axle from the driver's seat of the vehicle, especially when the load carried by the vehicle is increased considerably or if the load at one side of the center of gravity thereof is greater than the load on the other side of the center, and I have provided means for accomplishing this result, a simple form of which is illustrated in the drawings. As shown, the threaded connections, 26, for the springs extend through the brackets or arms, 21, and are provided with means for preventing rotation in said brackets. As shown, the key seats, 27, are formed in the screw threaded connections, 26, and keys, 28ª, are secured in the arms and extend into said key seats. Upon each screw threaded connection is threaded a worm gear, 28, which is confined against axial movement between the bracket and an extension, 29, thereof, as shown in Fig. 6. Meshing with each worm gear, 28, is a worm pinion, 30, loosely mounted upon a shaft, 31, which may form part of or be connected to the motor shaft of a motor, 32, supported upon the frame of the vehicle. The outer ends of the shaft, 31, may be journaled in bearings, 21ª, extending out from the brackets or arms, 21. Either or both of said worm pinions, 30, may be clutched to the shaft, 31, by suitable clutches, 33, operated by levers, 34, and extending up into the body carried upon the frame of the vehicle. The arrangement of the parts is such that when the motor, 32, is driven in one direction, the worm gearing will be driven in a direction to tighten up the tension of the spring, and when driven in the reverse direction, the tension of the spring will be weakened. If, however, the load at one side of the vehicle is greater than that at the other side, that lever on the side requiring greater tension for the spring is shifted over in the proper direction to increase the tension on that spring. It may be convenient to have a spirit level on the car to indicate whether or not the frame is held in a horizontal plane, so that the operator can manipulate the levers to regulate the tension of the springs so that they hold the body of the vehicle in a horizontal plane regardless of the weight of the load or its position with respect to the center of gravity of the car, and by observing the spirit level, may determine when the vehicle body is level.

Means are provided for guiding the axles to move in vertical directions, and said means may comprise upper and lower parallel movement links, 35, one pair at each side of the machine and connected to downturned ends, 36, of the side frame members, and also to the front axle. The connections between the links, frame and axle may comprise knuckle or universal joints of any suitable form for permitting any tilting of the axle caused by the wheels passing over uneven roadways. Substantially the same means may also be applied to the rear axle, but I have shown a slightly different form, the same comprising two comparatively long rods, 37, one located near each side member of the frame and rigidly secured to the rear axle and extending forward where its end is pivotally secured to the side frame member as at 38. Obviously the two forms are equivalents of each other and may be used interchangeably at either end of the machine.

Means are provided for preventing any considerable side sway of the frame and body carried thereby, and as shown, said means may comprise upright leaf springs, 39, secured to outstanding lugs, 40, which are provided on the axle, said leaf springs carrying at their upper ends rollers, 41, which run on upright tracks, 42, bolted or otherwise secured to the side frame members. Said leaf springs are made sufficiently heavy and strong to prevent much, if any, side sway of the frame and car carried thereby.

In operation the coiled tension springs, 20, act to swing the bell crank levers, 17, in the direction of the arrows, and inasmuch as the arms, 16, of said bell crank levers are supported from the axles by the links, 14, 15, the effect of said springs is to raise the frame, which tendency is, of course, opposed by the load carried by the frame. In driving over rough roads, if either wheel strikes a raised obstruction, said wheel, that end of the axle, and the link at that end are raised, the bell crank lever attached to said link swung on its pivot, without perceptibly raising the frame, and the spring is lengthened momentarily as the wheel rides to the top of the obstruction, and as it drops down the parts are returned to their normal position without lowering the frame to any appreciable extent. Likewise, when either wheel drops into a depression in the road, that end of the axle and the link move downward, turning the bell crank lever, and permitting the spring to contract; these movements take place without materially affecting the frame and the load carried thereby. As aforestated, the tension of the springs can be regulated at will to accommodate the load and its position with respect to the center of gravity of the vehicle. There is a particular advantage in using a long coiled spring because of the freedom of movement of the spring and because of this fact any of the wheels may raise or lower through a considerable extent without materially affecting the frame and thus shock and vibration of the frame is materially, if not wholly, eliminated, at least, the shock, jar and vibration are made scarcely perceptible.

More or less variation of the exact details of construction is possible without departing from the spirit of this invention, and I desire, therefore, not to limit myself to the exact construction shown and described, but intend in the following claims to point out all of the invention disclosed herein.

I claim as new and desire to secure by Letters Patent:

1. A vehicle spring construction comprising a frame, a vertically movable axle, wheels thereon, bell crank levers pivoted to said frame, each lever having a horizontal arm, and a downwardly projecting vertical arm, both of approximately the same length, vertical links, one depending from each horizontal arm of the levers and connected to said axle, long coiled springs extending parallel with the frame and connecting the vertical arms of the levers with the frame, and links extending parallel with the frame and connecting said axle with the frame.

2. A vehicle spring construction comprising an axle, wheels thereon, means for guiding said axle to move in a vertical direction, a vehicle frame, bell crank levers, one at each side of the frame and pivoted thereto, said bell crank levers having horizontal and vertical arms of substantially the same length, vertical links, one connecting each horizontal arm of the bell crank levers to said axle, and long coiled springs, the ends of which are fixedly attached to said vehicle frame and vertical arms of said bell crank levers.

3. A vehicle spring construction comprising an axle, wheels thereon, means for guiding said axle to move in a vertical direction, a vehicle frame, bell crank levers having horizontal and vertical arms of approximately the same length located at each side of the frame and pivoted thereto, vertical links connecting said axle with said horizontal arms of the bell crank levers, and long coiled tension springs fixedly secured to the vertical arms of the bell crank levers and fixedly secured to the frame.

4. A vehicle spring construction comprising an axle, wheels thereon, a vehicle frame, parallel movement links connecting said axle with said frame, bell crank levers at the sides of said frame and pivoted thereto, said bell crank levers having horizontal and vertical arms of approximately the same length, vertical links connecting said axle with said horizontal arms of the bell crank levers, and long coiled springs fixedly secured to the vertical arms of said bell crank levers and attached to the frame.

5. A vehicle spring construction comprising a vehicle frame, a vertically movable axle, horizontal links connecting the frame and axle, wheels journaled on said axle, bell crank levers pivoted on said frame, each lever having a horizontal arm and a vertical arm of substantially the same length, vertical links connecting the horizontal arms of said levers with said axle, and long coiled springs connected to the frame at one end and connected to the vertical arms of the bell crank levers at the other end.

6. A vehicle spring construction comprising an axle, wheels thereon, a vehicle frame, two bell crank levers pivoted to said frame at the sides thereof, and each having a horizontal arm connected to the axle, and also having a vertical arm, two coiled tension springs, each connected to a vertical arm of the bell crank levers, two threaded members slidably carried by said frame, one connected to each spring, a worm gear threaded upon each member, and motor driven worm pinions meshing with said worm gears.

7. A vehicle spring construction comprising an axle, wheels thereon, a vehicle frame, two bell crank levers pivoted to said frame at the sides thereof, and each having a horizontal arm connected to the axle, and also having a vertical arm, two coiled tension springs, each connected to a vertical arm of the bell crank levers, two threaded members slidably carried by said frame, one connected to each spring, a worm gear threaded upon each member, worm pinions meshing with said worm gears, a motor, a motor shaft carrying said worm pinions, and clutch mechanism between each worm pinion and shaft.

EMIL C. ZISTERER.